United States Patent
Nakano et al.

(10) Patent No.: US 6,864,884 B2
(45) Date of Patent: Mar. 8, 2005

(54) SYNCHRONIZATION SIGNAL GENERATION CIRCUIT, IMAGE DISPLAY APPARATUS USING SYNCHRONIZATION SIGNAL GENERATION CIRCUIT, AND METHOD FOR GENERATING SYNCHRONIZATION SIGNAL

(75) Inventors: Toshihisa Nakano, Tenri (JP); Akihiko Inoue, Kyoto (JP); Yuji Sato, Tenri (JP); Tomoyuki Ishihara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 548 days.

(21) Appl. No.: 09/906,785

(22) Filed: Jul. 18, 2001

(65) Prior Publication Data

US 2002/0011985 A1 Jan. 31, 2002

(30) Foreign Application Priority Data

Jul. 19, 2000 (JP) ........................................ 2000-219897
Jul. 13, 2001 (JP) ........................................ 2001-214444

(51) Int. Cl.[7] .............................................. G09G 5/00
(52) U.S. Cl. ........................... 345/213; 345/214; 345/99
(58) Field of Search ................................ 345/204, 208, 345/98, 99, 100, 213, 214, 3.1, 3.2, 3.3, 3.4; 348/521, 525, 526, 542, 547

(56) References Cited

U.S. PATENT DOCUMENTS

| | | | | |
|---|---|---|---|---|
| 4,947,264 A | * | 8/1990 | Narusawa ..................... | 386/18 |
| 5,369,498 A | * | 11/1994 | Banno et al. ................. | 386/45 |
| 6,229,573 B1 | * | 5/2001 | Sato et al. ................... | 348/516 |
| 6,362,805 B1 | * | 3/2002 | Jeong .......................... | 345/99 |

FOREIGN PATENT DOCUMENTS

| | | |
|---|---|---|
| JP | 06-178206 | 6/1994 |
| JP | 07-177469 | 7/1995 |

* cited by examiner

*Primary Examiner*—Xiao Wu
(74) *Attorney, Agent, or Firm*—Birch, Stewart, Kolasch & Birch, LLP

(57) ABSTRACT

A synchronization signal generation circuit includes: a synchronization signal generation section for generating a first vertical synchronization signal and a first horizontal synchronization signal based on an externally-supplied second vertical synchronization signal; and a detection section for detecting the second vertical synchronization signal, wherein when the second vertical synchronization signal is detected by the detection section for the first time, the first vertical synchronization signal is not output by the synchronization signal generation section, and when the second vertical synchronization signal is detected by the detection section for the next time at a predetermined timing, the first vertical synchronization signal is output by the synchronization signal generation section.

8 Claims, 9 Drawing Sheets

SYNCHRONIZATION SIGNAL GENERATION CIRCUIT, IMAGE DISPLAY APPARATUS USING SYNCHRONIZATION SIGNAL GENERATION CIRCUIT, AND METHOD FOR GENERATING SYNCHRONIZATION SIGNAL

BACKGROUND OF THE INVENTION

1. Field of the Invention

The present invention relates to a synchronization signal generation circuit for switching an internally-generated synchronization signal and a synchronization signal which is in synchronization with an externally-supplied vertical synchronization signal, and to an image display apparatus using such a synchronization signal generation circuit.

2. Description of the Related Art

In an image display apparatus using a liquid crystal panel or the like, in the case where images, characters, patterns, etc., are displayed based on an external composite video signal on a display screen in a superimposed fashion, the synchronization mode of the image display apparatus is switched between the internal synchronization mode where a vertical synchronization signal internally generated by a vertical synchronization signal generation circuit and a horizontal synchronization signal which is in synchronization with the internally-generated synchronization signal are output to a display section and the external synchronization mode where an externally-supplied vertical synchronization signal and a horizontal synchronization signal which is in synchronization with the externally-supplied synchronization signal are output to the display section. When the synchronization mode is switched, the signal level of the composite video signal which is output to the display section sharply changes at some points in its waveform, and accordingly, the vertical synchronization signal and the horizontal synchronization signal which are output to the display section have irregular frequencies. As a result, an image displayed on the display screen is temporarily disturbed.

As a means of addressing such a problem, a synchronization method which maintains the vertical synchronization signal and the horizontal synchronization signal which are output to the display section at regular frequencies is disclosed in Japanese Laid-Open Publication No. 6-178206 and Japanese Laid-Open Publication No. 7-177469.

FIG. 6 is a block diagram showing a circuit 6000 which uses an image display switching method disclosed in Japanese Laid-Open Publication No. 6-178206.

In the circuit 6000, a superimpose circuit 1 generates a superimpose signal based on an external composite video signal supplied from outside and outputs the generated external composite video signal to an analog switch (switching section) 5. The superimpose signal is a composite signal for displaying images, characters, patterns, etc., based on the external composite video signal on the display screen in a superimposed fashion.

Furthermore, the circuit 6000 has an inverter 7 for inverting the polarity of an internal synchronization signal, and an output of the inverter 7 is supplied to one of inverted input terminals of a NOR gate 8. The other inverted input terminal of the NOR gate 8 receives an output-off signal SOFF1. The NOR gate 8 logically synthesizes the signal output from the inverter 7 and the output-off signal SOFF1, and outputs the resultant synthesized signal to an internal composite video signal generation circuit 2.

The internal composite video signal generation circuit 2 generates, based on the signal from the NOR gate 8, a blueback signal which is a composite video signal for displaying images, characters, patterns, etc., on the display screen in a superimposed fashion. This blueback signal is input to an analog switch (switching section) 6.

Furthermore, the circuit 6000 has an inverter 3 for inverting the polarity of the externally-supplied synchronization switching signal S. A signal output from the inverter 3 is supplied to analog switches 5 and 6 and the inverter 4. The inverter 4 further inverts the polarity of the output signal from the inverter 3 and outputs a resultant signal to the analog switches 5 and 6. The analog switches 5 and 6 are controlled based on the signals output from the inverters 3 and 4 such that the states of the switches 5 and 6 differ from each other, i.e., such that when one of the switches 5 and 6 is open, the other is closed.

In the external synchronization mode, under the control of the signals output from the inverters 3 and 4, the analog switch 5 selects the superimpose signal supplied from the superimpose circuit 1 and outputs the selected superimpose signal as a composite video signal to the display section. The analog switch 6 is controlled based on the signals output from the inverters 3 and 4 such that the state of the analog switch 6 differs from that of the analog switch 5.

In the internal synchronization mode, the analog switch 6 selects the blueback signal supplied from the internal composite video signal generation circuit 2 and outputs the selected blueback signal as a composite video signal to the display section. When the analog switch 5 selects the superimpose signal, the analog switch 6 does not select the blueback signal.

FIG. 7 is a timing chart showing the signals described with reference to FIG. 6, i.e., a vertical synchronization signal included in the internal synchronization signal, a vertical synchronization signal included in the external composite video signal, the output-off signal SOFF1, the synchronization switching signal S, and a vertical synchronization signal included in the composite video signal output from the circuit 6000.

When the synchronization mode is switched from the internal synchronization mode to the external synchronization mode, the output-off signal SOFF1 rises to a high level before the synchronization switching signal S rises to a high level. With such an arrangement, the internal synchronization signal whose polarity has been inverted by the inverter 7 is supplied from the NOR gate 8 to the internal composite video signal generation circuit 2. Thus, during a period when the output-off signal SOFF1 is at a high level, the blueback signal is not output from the internal composite video signal generation circuit 2.

After the supply of the blueback signal from the internal composite video signal generation circuit 2 is continuously suspended (i.e., the blueback signal is "OFF") for at least one field time or more, the synchronization switching signal S rises from a low level to a high level, whereby the synchronization mode is switched from the internal synchronization mode to the external synchronization mode. As a result, the analog switch 6 is turned off whereas the analog switch 5 is turned on. Thus, the superimpose signal generated by the superimpose signal circuit 1 is output as the composite video signal to the display section. Thus, the switching from the internal synchronization mode to the external synchronization mode is achieved by providing an OFF period of one field time or more between the internal composite video signal and the external composite video signal. With such an arrangement, the vertical synchronization signal included in the composite video signal which is output to the display section is prevented from having irregular frequencies.

FIG. 8 is a block diagram showing a frame pulse generation circuit 8000 in a record and reproduction apparatus disclosed in Japanese Laid-Open Publication No. 7-177469. A frame pulse is generated based on a vertical synchronization signal, and the vertical synchronization signal is generated based on the frame pulse. Thus, the frame pulse and the vertical synchronization signal are in synchronization with each other. A synchronization method in the frame pulse generation circuit 8000 is described as a method for synchronizing a vertical synchronization signal and a horizontal synchronization signal.

The frame pulse generation circuit shown in FIG. 8 includes a frame length determination section 11, an internal vertical synchronization signal generation section 17, a window pulse generation section 22, an output control section 23, and a timing control section 24. The frame length determination section 11 includes: a frame length detection circuit 12 for detecting a frequency of a frame pulse which is input to the frame length determination section 11 based on an externally provided vertical synchronization signal (i.e., for detecting the length of one frame length); and three comparators 13, 14, and 15 for determining the length of one frame of the frame pulse detected by the frame length detection circuit 12.

When one frame of the frame pulse detected by the frame length detection circuit 12 is longer than one frame of a frame pulse having a standard frequency by 1% or more of the one frame of the standard frequency frame pulse, the comparator 13 outputs a high level signal. When one frame of the frame pulse detected by the frame length detection circuit 12 is shorter than one frame of the frame pulse having the standard frequency by 1% or more of the one frame of the standard frequency frame pulse, the comparator 14 outputs a high level signal. When the difference of one frame of the frame pulse detected by the frame length detection circuit 12 and one frame of the frame pulse having the standard frequency is within a±1% range, the comparator 15 outputs a high level signal.

The output of the comparator 13 is supplied to a plus counter 18 of the internal vertical synchronization signal generation section 17 and to a previous frame state detection section 16. A signal output from the plus counter 18 is supplied to a frame pulse generation section 20 which generates a frame pulse having a frequency that is 1% or more higher than that of the standard frequency frame pulse.

The output of the comparator 14 is supplied to a minus counter 19 of the internal vertical synchronization signal generation section 17 and to the previous frame state detection section 16. A signal output from the minus counter 19 is supplied to a frame pulse generation section 21 which generates a frame pulse having a frequency that is 1% or less lower than that of the standard frequency frame pulse.

A switch 27 selects one of an output signal from the frame pulse generation section 20 and an output signal from the frame pulse generation section 21. The switch 27 is switched by the output control section 23 which is controlled by the previous frame state detection section 16. The output signal of the frame pulse generation section 20 or 21 is supplied to the timing control section 24 and to a switch terminal 28a of the switch 28 which is controlled by the timing control section 24. The timing control section 24 receives an output of the window pulse generation section 22 and the output of the comparator 15.

The output of the comparator 15 is supplied to a switch 25 provided between the input terminal 10 and the counters 18 and 19, to a switch 26 provided between the input terminal 10 and a switch terminal 28b of the switch 28, and to the timing control section 24.

An operation of the frame pulse generation circuit 8000 having the above structure is described below.

The input terminal 10 receives a frame pulse generated based on an externally-supplied vertical synchronization signal, and the generated frame pulse is supplied to the frame length detection circuit 12. The frame length detection circuit 12 detects rising edges of the frame pulse, thereby detecting the length of one frame of the frame pulse. When the difference in length between the detected one frame and one frame of the frame pulse having the standard frequency is within a ±1% range, the comparator 15 outputs a high level signal, whereby the switches 25 and 26 are turned on. As a result, the counters 18 and 19 of the internal vertical synchronization signal generation section 17 are reset in synchronization with a rising edge of the frame pulse. On the other hand, a frame pulse input through the input terminal 10 is supplied to the switch terminal 28b of the switch 28. The timing control section 24 controls the switch 28 based on the output signal from the comparator 15 such that a common terminal 28c of the switch 28 is connected to the switch terminal 28b. As a result, the frame pulse input through the input terminal 10 is supplied as it is to an output terminal 30. This state is in the external synchronization mode.

Alternatively, when the one frame detected by the frame length detection circuit 12 is longer or shorter than one frame of a frame pulse having a standard frequency by 1% or more of the one frame of the standard frequency frame pulse, the counter 18 or 19 operates based on the output signal from the comparator 13 or 14, whereby the output signal from the counter 18 is supplied to the frame pulse generation circuit 20 or the output signal from the counter 19 is supplied to the frame pulse generation circuit 21. As a result, a frame pulse is generated. In the meantime, based on the output signal from the comparator 13 or 14, an output signal from the previous frame state detection section 16 is supplied to the output control section 23, which in turn controls the switch 27 such that the common terminal 27c is connected to one of the switch terminals 27a and 27b. In addition to the switching of the switch 27, the timing control section 24 controls the switch 28 such that the common terminal 28c is connected to the switch terminal 28a, whereby the switch terminal 27a or 27b is connected to the common terminal 28c of the switch 28.

Thus, when the difference in length between the detected one frame and one frame of the frame pulse having the standard frequency exceeds a ±1% range, a frame pulse generated by the frame pulse generation section 20 or 21 is output from the output terminal 30. This state is in the internal synchronization mode.

When the synchronization mode is switched from the internal synchronization mode to the external synchronization mode, the window pulse generation section 22 is used to generate window pulses based on a frame pulse which is generated based on an externally-supplied vertical synchronization signal. Furthermore, even when the difference in length between the detected one frame of an externally-supplied frame pulse and one frame of the frame pulse having the standard frequency is within a ±1% range, the synchronization mode is not switched from the internal synchronization mode to the external synchronization mode until a frame pulse is generated by the internal vertical synchronization signal generation section 17 within an active area of the window pulse.

FIG. 9 is a timing chart for the signal output from the terminal 30 in the frame pulse generation circuit 8000 of FIG. 8 when the synchronization mode is switched from the internal synchronization mode to the external synchronization mode. In the case where window pulses are generated by the window pulse generation section 22 based on a frame pulse which is generated based on an externally-supplied vertical synchronization signal, the synchronization mode is not switched from the internal synchronization mode to the external synchronization mode until a pulse of an internal synchronization signal is generated within an active area of the window pulse. Thus, a frame pulse to be output (signal output from the terminal 30) can be kept at a regular frequency. Therefore, even when the difference in length between one frame of an externally-supplied vertical synchronization signal and one frame of the frame pulse having the standard frequency is within a ±1% range, the synchronization mode is not immediately switched from the internal synchronization mode to the external synchronization mode. As a result, the vertical synchronization signal to be output from the terminal 30 can be kept at a regular frequency.

In an image switching method using the circuit 6000 shown in FIG. 6, when a vertical synchronization signal included in an external composite video signal is input to the circuit 6000 at an irregular timing, the circuit 6000 outputs a vertical synchronization signal which is in synchronization with the vertical synchronization signal included in the external composite video signal which is input at an irregular timing. Furthermore, in the case where the display section to which the output vertical synchronization signal is supplied is a liquid crystal display device, if the OFF period of the blueback signal output from the internal composite video signal generation circuit 2 is equal to or longer than the time for discharging potential which is applied to a liquid crystal in the liquid crystal display device, display on the screen results in an abnormal state.

In the frame pulse generation circuit 8000 of the record and reproduction apparatus shown in FIG. 8, it is necessary to continuously supply a vertical synchronization signal from outside. Furthermore, information such as video data supplied from the outside, or the like, cannot be used until the synchronization mode is switched from the internal synchronization mode to the external synchronization mode. Thus, during such a period, a video image cannot be displayed. Furthermore, in a system to which a synchronization signal is supplied from outside in an irregular fashion (for example, a system including an image display apparatus where in a normal operation, a video image adjusted to the timing of a synchronization signal supplied from an external device (host device) is displayed while it is retained in (written in and read from) a frame memory inside the image display apparatus, and when the supply of the synchronization signal is stopped, writing in the frame memory is stopped, and a video signal retained in the frame memory is continuously read in the internal synchronization mode), when all or a portion of an image displayed on the display screen is replaced, the external apparatus only supplies the synchronization signal corresponding to the number of times that the display screen is replaced. Thus, the supply of the synchronization signal from outside may be stopped until a pulse of an internal synchronization signal is generated within an active area of the window pulse. In such a case, the synchronization mode cannot be switched from the internal synchronization mode to the external synchronization mode.

SUMMARY OF THE INVENTION

According to one aspect of the present invention, a synchronization signal generation circuit includes: a synchronization signal generation section for generating a first vertical synchronization signal and a first horizontal synchronization signal based on an externally-supplied second vertical synchronization signal; and a detection section for detecting the second vertical synchronization signal, wherein when the second vertical synchronization signal is detected by the detection section for the first time, the first vertical synchronization signal is not output by the synchronization signal generation section, and when the second vertical synchronization signal is detected by the detection section for the next time at a predetermined timing, the first vertical synchronization signal is output by the synchronization signal generation section.

With such features of the present invention, when an externally-supplied vertical synchronization signal is identified for the first time, a vertical synchronization signal generated in a synchronization signal generation circuit is not output, and when an externally-supplied vertical synchronization signal is identified for the next time, a vertical synchronization signal which is in synchronization with the externally-supplied vertical synchronization signal is generated and output. With such an arrangement, the frequency of the vertical synchronization signal output from the synchronization signal generation circuit does not sharply change. Accordingly, even when the externally-supplied vertical synchronization signal is intermittently input to the synchronization signal generation circuit, video data to be displayed can be continuously observed on a display screen.

In one embodiment of the present invention, when the second vertical synchronization signal is detected by the detection section for the first time, a second horizontal synchronization signal is output by the synchronization signal generation section, and when the second vertical synchronization signal is detected by the detection section for the next time at the predetermined timing, the first horizontal synchronization signal which is in synchronization with the second vertical synchronization signal is output by the synchronization signal generation section.

In another embodiment of the present invention, the second horizontal synchronization signal is not in synchronization with the second vertical synchronization signal.

With such features of the present invention, when an externally-supplied vertical synchronization signal is identified for the first time, a horizontal synchronization signal which is not in synchronization with the externally-supplied vertical synchronization signal is output, and when an externally-supplied vertical synchronization signal is input for the next time at a predetermined timing, a horizontal synchronization signal which is in synchronization with the externally-supplied vertical synchronization signal is generated and output. With such an arrangement, the frequency of the vertical synchronization signal output from the synchronization signal generation circuit does not sharply change. Accordingly, even when the externally-supplied vertical synchronization signal is intermittently input to the synchronization signal generation circuit, video data to be displayed can be continuously observed on a display screen.

In another embodiment of the present invention, the first vertical synchronization signal and the first horizontal synchronization signal which are in synchronization with the second vertical synchronization signal are output during a blanking interval.

With such features of the present invention, when a vertical synchronization signal output from the synchronization signal generation circuit is adjusted so as to be in synchronization with the externally-supplied vertical synchronization signal, the vertical synchronization signal is adjusted such that a blanking time when video data is not output is optimized. With such an arrangement, even when the frequencies of a horizontal synchronization signal and a vertical synchronization signal which are output from the synchronization signal generation circuit abruptly change, there is no data at the time when the change occur, and accordingly, video data would never be disturbed. Furthermore, the variation range of the frequency of the vertical synchronization signal is minimized. Therefore, even when the externally-supplied vertical synchronization signal is intermittently input to the synchronization signal generation circuit, video data to be displayed can be continuously observed on a display screen.

According to another aspect of the present invention, an image display apparatus includes: the above synchronization signal generation circuit; and at least one storage device which stores externally-supplied video data and from which the video data is read.

With such features of the present invention, all externally-supplied information can be retained as long as the frequency of a vertical synchronization signal included in externally-supplied video data is within a predetermined range set in the synchronization signal generation circuit. Thus, all of the externally-supplied information can be continuously displayed without being deleted.

According to still another aspect of the present invention, a synchronization signal generation method for generating a first vertical synchronization signal and a first horizontal synchronization signal based on an externally-supplied second vertical synchronization signal includes steps of: not outputting the first vertical synchronization signal when the second vertical synchronization signal is detected for the first time, but outputting the first vertical synchronization signal when the second vertical synchronization signal is detected for the next time at a predetermined timing; and outputting a second horizontal synchronization signal when the second vertical synchronization signal is detected for the first time, and outputting the first horizontal synchronization signal which is in synchronization with the second vertical synchronization signal when the second vertical synchronization signal is detected for the next time at the predetermined timing.

In one embodiment of the present invention, the second horizontal synchronization signal is not in synchronization with the second vertical synchronization signal.

With such features of the present invention, when an externally-supplied vertical synchronization signal is identified for the first time, a vertical synchronization signal generated in a synchronization signal generation circuit is not output, and when an externally-supplied vertical synchronization signal is identified for the next time, a vertical synchronization signal which is in synchronization with the externally-supplied vertical synchronization signal is generated and output. Furthermore, when an externally-supplied vertical synchronization signal is identified for the first time, a horizontal synchronization signal which is not in synchronization with the externally-supplied vertical synchronization signal, and when an externally-supplied vertical synchronization signal is input for the next time at a predetermined timing, a horizontal synchronization signal which is in synchronization with the externally-supplied vertical synchronization signal is generated and output. With such an arrangement, the frequency of the vertical synchronization signal output from the synchronization signal generation circuit does not sharply change. Accordingly, even when the externally-supplied vertical synchronization signal is intermittently input to the synchronization signal generation circuit, video data to be displayed can be continuously observed on a display screen.

In another embodiment of the present invention, the first vertical synchronization signal and the first horizontal synchronization signal which are in synchronization with the second vertical synchronization signal are output during a blanking interval.

With such features of the present invention, when a vertical synchronization signal output from the synchronization signal generation circuit is adjusted so as to be in synchronization with the externally-supplied vertical synchronization signal, the vertical synchronization signal is adjusted such that a blanking time when video data is not output is optimized. With such an arrangement, even when the frequencies of a horizontal synchronization signal and a vertical synchronization signal which are output from the synchronization signal generation circuit abruptly change, there is no data at the time when the change occur, and accordingly, video data would never be disturbed. Furthermore, the variation range of the frequency of the vertical synchronization signal is minimized. Therefore, even when the externally-supplied vertical synchronization signal is intermittently input to the synchronization signal generation circuit, video data to be displayed can be continuously observed on a display screen.

Thus, the invention described herein makes possible the advantages of (1) providing a synchronization signal generation circuit which can prevent video data from being disturbed when a synchronization signal is generated so as to be in synchronization with a synchronization signal which is intermittently supplied externally at a standard timing; and (2) providing an image display apparatus which can display all information supplied from outside by using the above synchronization signal generation circuit.

These and other advantages of the present invention will become apparent to those skilled in the art upon reading and understanding the following detailed description with reference to the accompanying figures.

DESCRIPTION OF THE PREFERRED EMBODIMENTS

Hereinafter, an embodiment of the present invention will be described with reference to the drawings.

Figure 4:
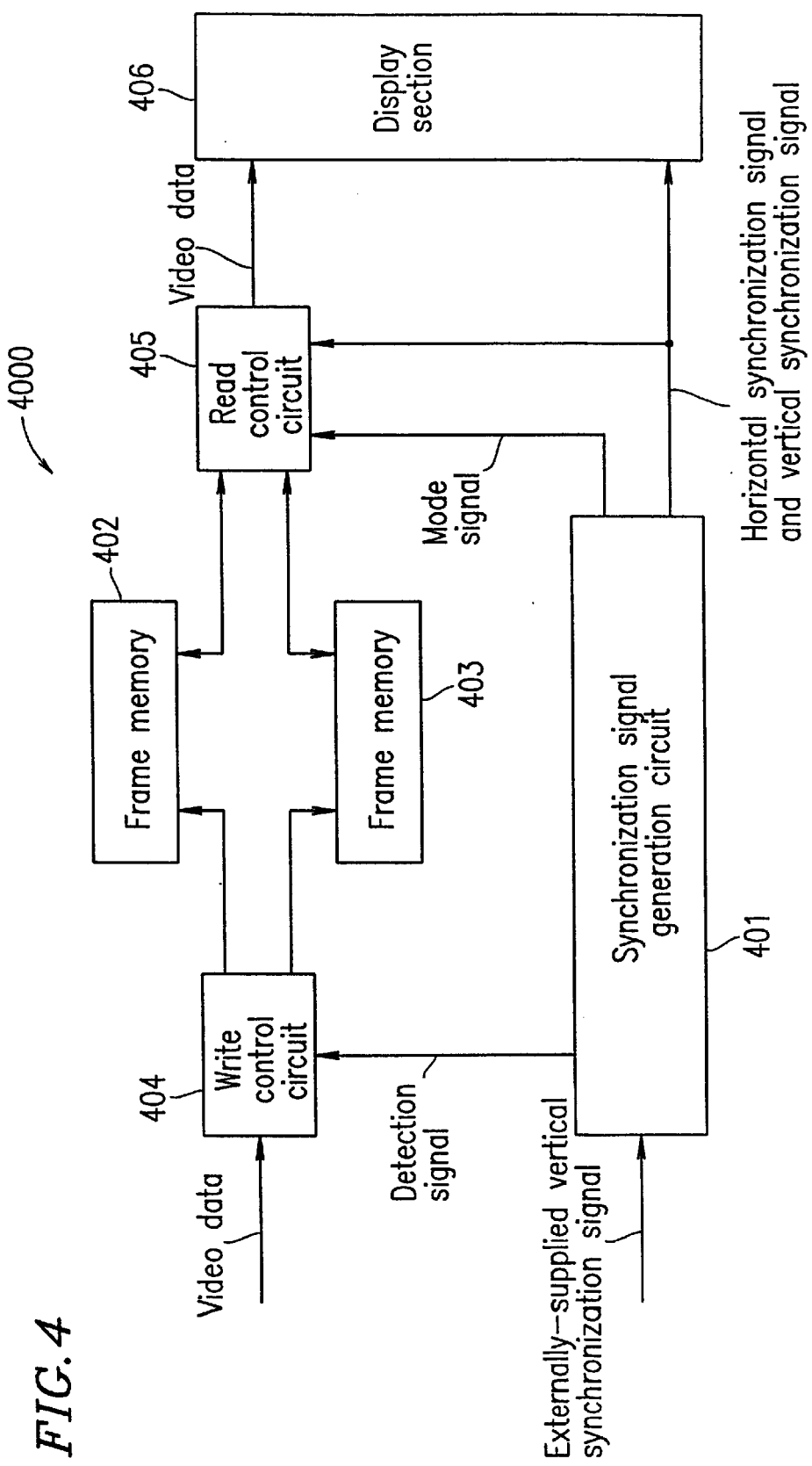
FIG. 4 is a block diagram showing an image display apparatus according to the present invention.

FIG. 4 is a block diagram showing an image display apparatus 4000 according to the present invention. The image display apparatus 4000 includes: a synchronization signal generation circuit 401; frame memories 402 and 403; a write control circuit 404 for determining which of the frame memories 402 and 403 data is written in; a read control circuit 405 for determining which of the frame memories 402 and 403 data is read from; and a display section 406 (e.g., liquid crystal panel) for displaying video data.

The synchronization signal generation circuit 401 detects a vertical synchronization signal supplied from outside and outputs a detection signal to a write control circuit 404. In response to the detection signal, the write control circuit 404 selects one of the frame memories 402 and 403 and writes video data in the selected frame memory 402 or 403.

In the meantime, the synchronization signal generation circuit 401 generates a vertical synchronization signal which pulses at a certain interval and a horizontal synchronization signal which pulses at a certain interval based on the externally-supplied vertical synchronization signal, and outputs these synchronization signals to the display section 406 and the read control circuit 405.

The synchronization signal generation circuit 401 outputs a mode signal to the read control circuit 405 together with the vertical and horizontal synchronization signals. The mode signal indicates whether the vertical synchronization signal is supplied from the synchronization signal generation circuit 401 to the read control circuit 405 in synchronization with a vertical synchronization signal generated in the synchronization signal generation circuit 401 (internal synchronization mode) or in synchronization with a externally-supplied vertical synchronization signal (external synchronization mode).

When the vertical synchronization signal is supplied in the internal synchronization mode, the read control circuit 405 does not switch the frame memory from which data is read and continues to read data from the currently-selected frame memory (frame memory 402 or 403). Alternatively, when the vertical synchronization signal is supplied in the external synchronization mode, the read control circuit 405 switches the frame memory to read data from the other one of the frame memories 402 and 403. The display section 406 displays video data based on the vertical and horizontal synchronization signals supplied from the synchronization signal generation circuit 401.

Figure 1:
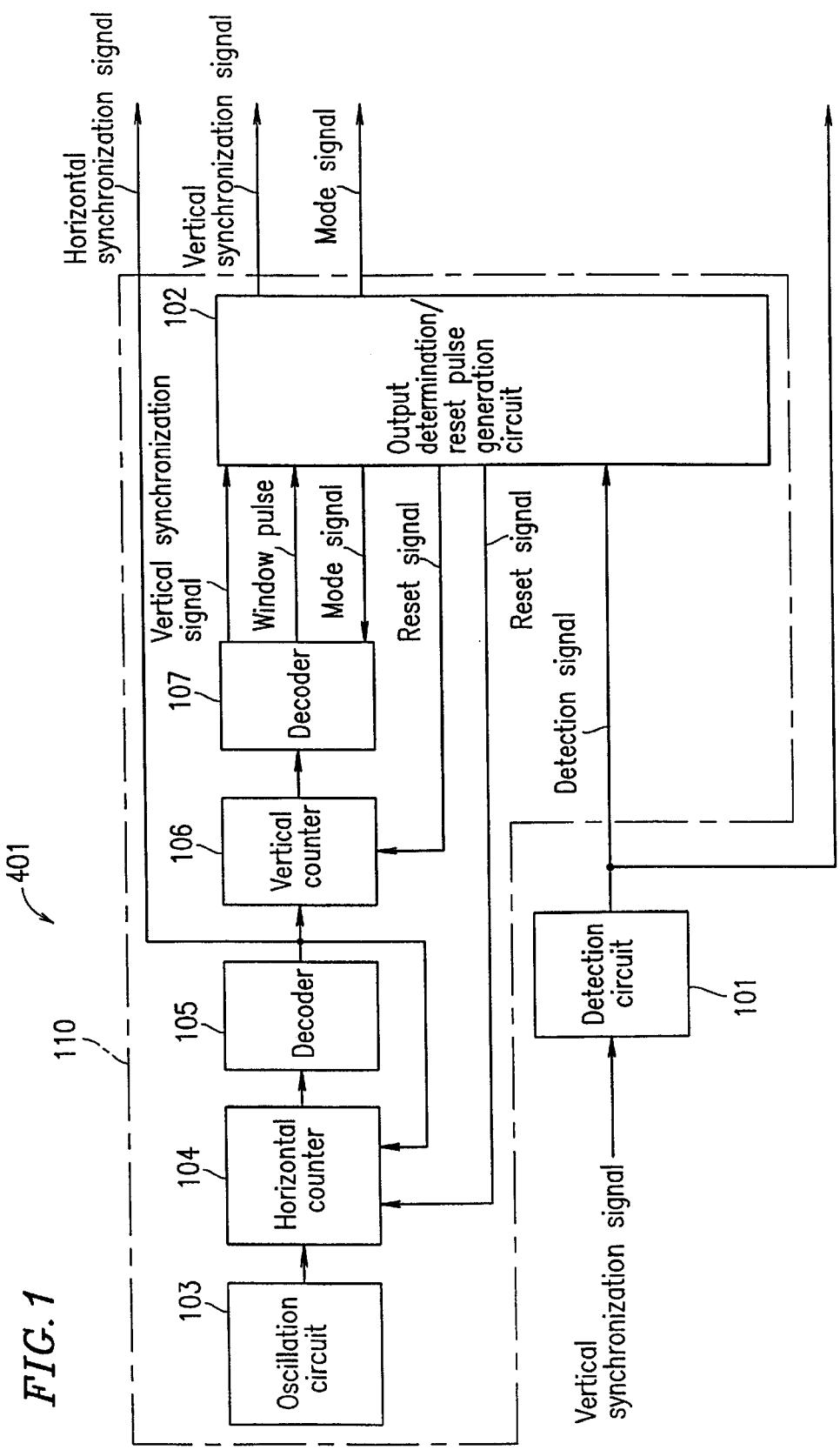
FIG. 1 is a block diagram showing a synchronization signal generation circuit according to the present invention.

FIG. 1 is a block diagram showing a synchronization signal generation circuit 401 according to the present invention. The synchronization signal generation circuit 401 includes a detection circuit 101 for detecting that a vertical synchronization signal is input from outside, and a synchronization signal generation section 110 for generating a vertical synchronization signal and a horizontal synchronization signal based on the externally-supplied vertical synchronization signal. The synchronization signal generation section 110 includes an output determination/reset pulse generation circuit 102 for receiving a detection signal which is output by the detection circuit 101 in response to a vertical synchronization signal supplied from outside; an oscillation circuit 103 for generating a clock signal suitable for characteristics of the display section 406 (FIG. 4); a horizontal counter 104; decoders 105 and 107; and a vertical counter 106.

The oscillation circuit 103 outputs the generated clock signal to a horizontal counter 104. The horizontal counter 104 samples the clock signal from the oscillation circuit 103 count the horizontal frequency of the clock signal. When the counted value of the horizontal frequency of the clock signal reaches a predetermined count value, the horizontal counter 104 outputs the counted value to the decoder 105. The decoder 105 decodes the counted value from the horizontal counter 104 to generate and output a horizontal synchronization signal to a vertical counter 106 and to the read control circuit 405 and the display section 406 (FIG. 4). Furthermore, the generated horizontal synchronization signal is output as a reset signal to the horizontal counter 104. The horizontal counter 104 is reset by a horizontal synchronization signal from the decode 105. The horizontal counter 104 can be reset by a reset signal from the output determination/reset pulse generation circuit 102.

The vertical counter 106 samples the horizontal synchronization signal from the decoder 105 to count the frequency of the vertical synchronization signal. When the counted value reaches a predetermined count value, the vertical counter 106 outputs the counted value to the decoder 107. The vertical counter 106 is reset by a reset signal from the output determination/reset pulse generation circuit 102. The above counted value must be set such that the frequency of the generated vertical synchronization signal is longer than that of the horizontal synchronization signal supplied externally.

The decoder 107 decodes the value counted by the vertical counter 106 to generate a vertical synchronization signal. The decoder 107 outputs the generated vertical synchronization signal and window pulses to the output determination/reset pulse generation circuit 102. Herein, the window pulses are output by the decoder 107 at a predetermined frequency in synchronization with the horizontal synchronization signal by using the externally-supplied vertical synchronization signal as a reference in order to determine the frequency of the externally-supplied vertical synchronization signal. Furthermore, a window pulse is output within a blanking interval (vertical blanking interval) when video data is not input/output. The limiting value for the frequency of the externally-supplied vertical synchronization signal can be modified by changing the width of the window pulse within the blanking interval.

Furthermore, the decoder 107 receives a mode signal which indicates the synchronization mode (internal synchronization mode or external synchronization mode) from the output determination/reset pulse generation circuit 102. The mode signal indicates whether the synchronization signal generation circuit 401 outputs the externally-supplied vertical synchronization signal (external synchronization mode) or outputs the vertical synchronization signal generated by the decoder 107 (internal synchronization mode).

The output determination/reset pulse generation circuit 102 determined based on the detection signal from the detection circuit 101 and the window pulse from the decoder 107 whether or not the circuit 102 outputs a reset signal to the horizontal counter 104 and the vertical counter 106 according to the synchronization mode at the time when the detection signal is input to the circuit 102. Furthermore, the output determination/reset pulse generation circuit 102 determines whether or not the vertical synchronization signal from the decoder 107 is output, and based on a result of the determination, outputs the vertical synchronization signal to the read control circuit 405 and the display section 406 (FIG. 4). It should be noted that in the present embodiment, for the purpose of simplifying the description, the horizontal synchronization signal and the vertical synchronization signal are pulse signals.

Figure 2:
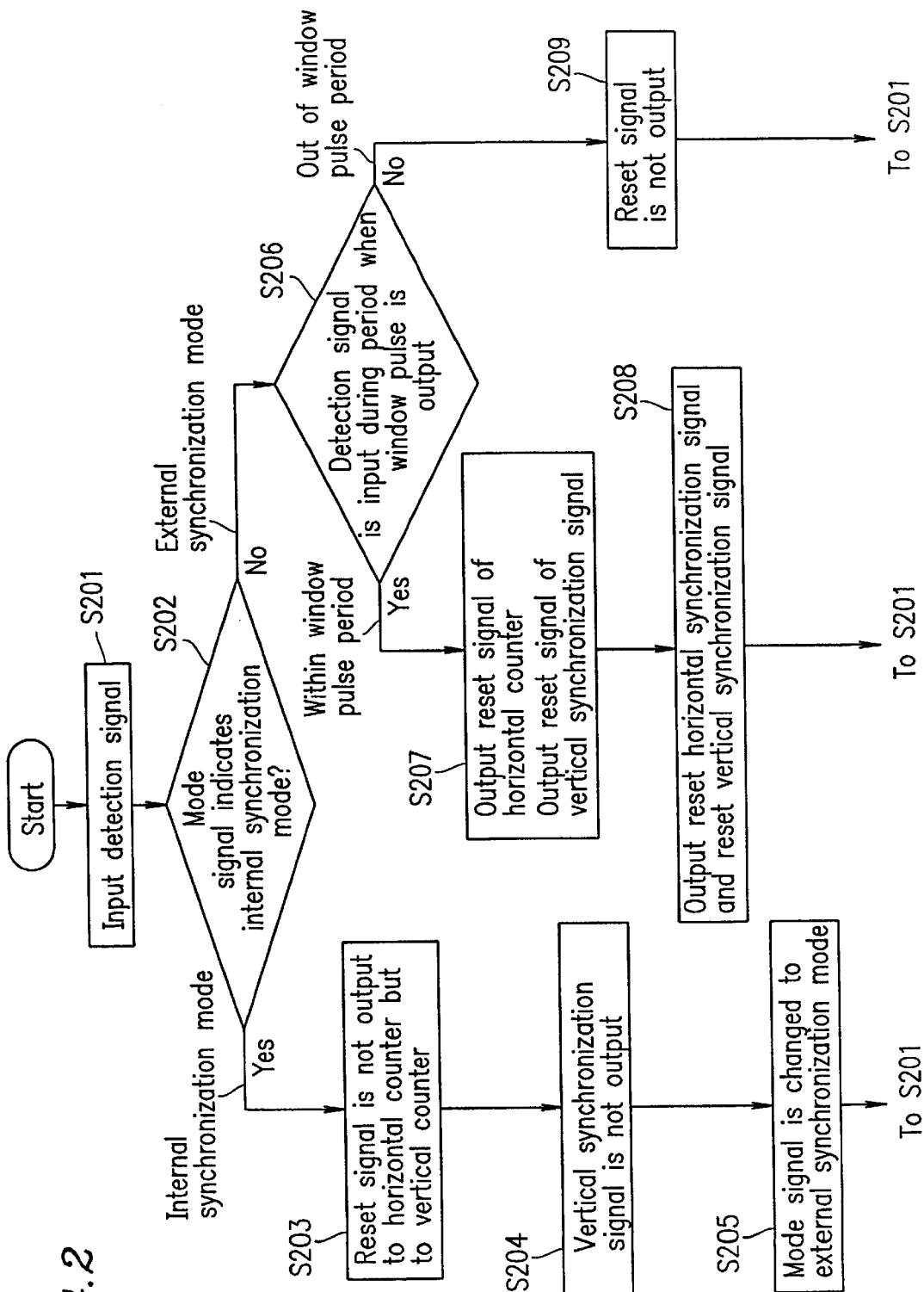
FIG. 2 is a flowchart for illustrating an operation of an output determination/reset pulse generation circuit when a vertical synchronization signal is input thereto.
Figure 3:
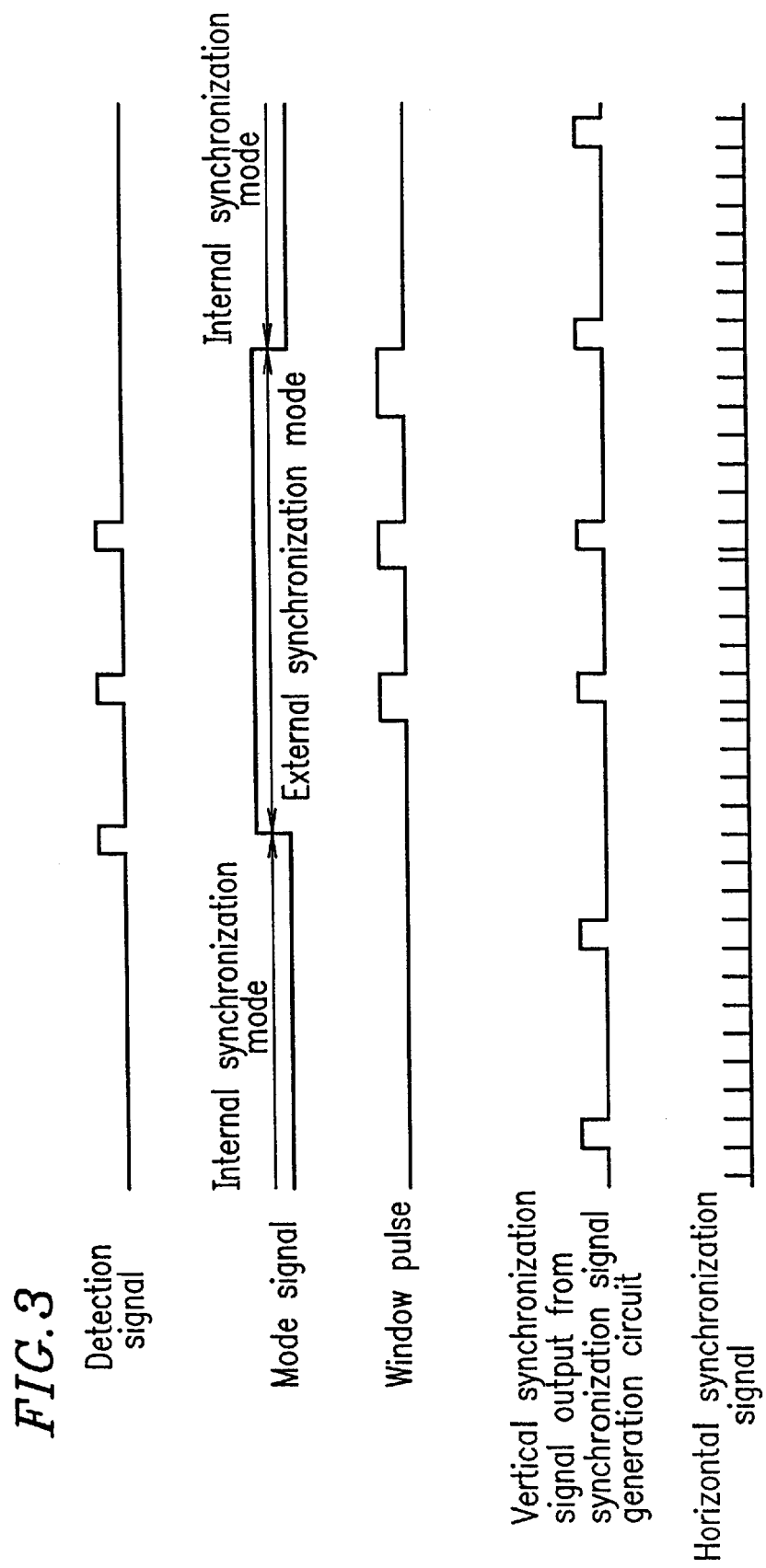
FIG. 3 is a timing chart showing respective signal pulses in the synchronization signal generation circuit according to the present invention.

FIG. 2 is a flowchart for illustrating an operation of the output determination/reset pulse generation circuit 102 when a detection signal from the detection circuit 101 is input to the circuit 102. FIG. 3 is a timing chart showing respective signal pulses in the synchronization signal generation circuit 401 including the output determination/reset pulse generation circuit 102 according to the present invention.

First, an operation of the output determination/reset pulse generation circuit 102 in the case where the externally-supplied vertical synchronization signal is not input in the detection circuit 101 is described with reference to FIG. 1, before describing an operation of the output determination/reset pulse generation circuit 102 in the case where the detection signal is input from the detection circuit 101 to the output determination/reset pulse generation circuit 102.

In the case where the externally-supplied vertical synchronization signal is not input in the detection circuit 101, i.e., in the case where a detection signal is not output from the detection circuit 101, an mode signal output from the output determination/reset pulse generation circuit 102 indicates the internal synchronization mode. Thus, the decoder 105 outputs a horizontal synchronization signal with a predetermined frequency. The horizontal counter 104 is reset by the horizontal synchronization signal from the decoder 105.

When the horizontal synchronization signal from the decoder 105 is counted by the vertical counter 106 up to a predetermined counted value, the decoder 107 outputs a vertical synchronization signal with a predetermined frequency which is in synchronization with the horizontal synchronization signal. The vertical counter 106 is reset by a reset signal which is generated by the output determination/reset pulse generation circuit 102 based on the vertical synchronization signal output from the decoder 107.

The horizontal synchronization signal output from the decoder 105 is output to the read control circuit 405 and the display section 406 (FIG. 4). The vertical synchronization signal output from the decoder 107 in synchronization with the horizontal synchronization signal is output from the output determination/reset pulse generation circuit 102 as an output of the synchronization signal generation circuit 401 to the read control circuit 405 and the display section 406.

Referring to FIGS. 2 and 3, when a vertical synchronization signal is input from outside to the detection circuit 101, and a detection signal from the detection circuit 101 is input to the output determination/reset pulse generation circuit 102 (steps S201 and S202), if the synchronization mode is in the internal synchronization mode, the output determination/reset pulse generation circuit 102 outputs a reset signal not to the horizontal counter 104 but only to the vertical counter 106 (step S203). This operation is performed for the purpose of preventing the horizontal synchronization signal from being in synchronization with a first pulse of the externally-supplied vertical synchronization signal and allowing the vertical counter 106 to perform a count operation in order to determine the frequency of the vertical synchronization signal after the time when the externally-supplied vertical synchronization signal has been input.

In this operation, the vertical synchronization signal output from the decoder 107 is subjected to masking processing in the output determination/reset pulse generation circuit 102, whereby the vertical synchronization signal is not output from the synchronization signal generation circuit 401 (step S204). Only the first horizontal synchronization signal output from the horizontal counter 104 is output from the synchronization signal generation circuit 401. This horizontal synchronization signal is not in synchronization with the externally-supplied vertical synchronization signal regardless of whether a detection signal is input to the output determination/reset pulse generation circuit 102.

The first pulse of the vertical synchronization signal supplied from outside to the synchronization signal generation circuit 401 is not in synchronization with the vertical synchronization signal in the internal synchronization mode, i.e., with the internally-generated vertical synchronization signal. Thus, during a period when video data is being displayed, when a first pulse of the vertical synchronization signal is input from outside, only the vertical counter 106 is reset, and the horizontal counter 104 is not reset, whereby a change of the frequency of the horizontal synchronization signal is prevented, and accordingly, the display of the video data is prevented from being disturbed.

According to the present invention, a blanking interval is extended such that a next pulse of the vertical synchronization signal from the synchronization signal generation circuit 401 is within the blanking interval, whereby the display of the video data is prevented from being disturbed.

In the output determination/reset pulse generation circuit 102, the mode signal which is currently indicating the internal synchronization mode is modified, in synchronization with at the first falling edge of the detection signal output from the detection circuit 101, so as to indicate the external synchronization mode (step S205). At the time when the internal synchronization mode is modified, i.e., at step S205, the vertical synchronization signal and the horizontal synchronization signal are not yet switched to the external synchronization mode.

When the output determination/reset pulse generation circuit 102 operates in the external synchronization mode, the decoder 107 outputs window pulses. When the externally-supplied vertical synchronization signal having a specific predetermined frequency is input to the detection circuit 101, the next pulse of the externally-supplied vertical synchronization signal is input subsequently to the first pulse of the externally-supplied vertical synchronization signal, to the detection circuit 101 at a predetermined timing. If during a period when the window pulses are output, the next pulse of the externally-supplied vertical synchronization signal is input to the detection circuit 101, and a detection signal is input to the output determination/reset pulse generation circuit 102 ("Yes" at step S206), the output determination/reset pulse generation circuit 102 outputs a reset signal to the horizontal counter 104 and the vertical counter 106 (step S207).

The horizontal counter 104 is reset by the reset signal, whereby the decoder 105 outputs a reset (i.e., fresh) horizontal synchronization signal. In the meantime, the vertical counter 106 is reset, whereby a vertical synchronization signal is output from the decoder 107 (step S208). These mean that the horizontal synchronization signal and the vertical synchronization signal output from the synchronization signal generation circuit 401 are in synchronization with the detection signal for the externally-supplied vertical synchronization signal at a falling edge of the detection signal within the pulse width of the window pulse. With such an arrangement, the video data to be displayed can be prevented from being disturbed. This is because during a period when a window pulse which indicates a blanking interval (vertical blanking interval) when video data is not output is output, the internally-generated horizontal synchronization signal and vertical synchronization signal are in synchronization with a detection signal corresponding to the externally-supplied vertical synchronization signal. Furthermore, the blanking interval is extended such that the next pulse of the externally-supplied vertical synchronization signal falls within the blanking interval, whereby the vertical synchronization signal is output from the decoder 107 to the output determination/reset pulse generation circuit 102 concurrently with the detection signal corresponding to the externally-supplied vertical synchronization signal being input from the detection circuit 101 to the circuit 102. As a result, the blanking interval can be limited to an optimum, required minimum time. In this case, the mode signal is not modified, the synchronization mode remains the external synchronization mode, and the horizontal synchronization signal and the vertical synchronization signal which are in synchronization with the detection signal corresponding to the externally-supplied vertical synchronization signal are output from the synchronization signal generation circuit 401.

Alternatively, in the case where during a period when the window pulse is being output, a detection signal corresponding to the externally-supplied vertical synchronization signal is not input to the output determination/reset pulse generation circuit 102, the output determination/reset pulse generation circuit 102 does not output a reset signal to the horizontal counter 104 and the vertical counter 106 (step S209). At the time when the supply of the window pulse is stopped, the output determination/reset pulse generation circuit 102 outputs a reset signal only to the vertical counter 106.

In this case, the window pulses generated by the decoder 107 are generated based on the counted value for the horizontal synchronization signal which has been counted by the vertical counter 106. Thus, at the time when the supply of the window pulses is stopped, the horizontal counter 104 is reset by the horizontal synchronization signal, which is output from the decoder 105 and counted by the vertical counter 106, at a same timing as that when the vertical counter 106 is reset. Then, the mode signal is modified such that the synchronization mode is switched from the external synchronization mode to the internal synchronization mode. After this switching of the synchronization mode, the vertical synchronization signal generated by the synchronization signal generation circuit 401 and the horizontal synchronization signal which is in synchronization with the vertical synchronization signal generated by the circuit 401 are output from the synchronization signal generation circuit 401.

Alternatively, in the case where the detection circuit 101 does not receive an externally-supplied vertical synchronization signal and therefore does not outputs a detection signal to the output determination/reset pulse generation circuit 102, at the time when the supply of the window pulse is stopped, the output determination/reset pulse generation circuit 102 outputs a reset signal only to the vertical counter 106, which is the same as the previously-described case where the detection signal does not pulse during a period when the window pulses are output from the decoder 107. Then, the mode signal which is currently indicating the external synchronization mode is modified so as to indicate the internal synchronization mode.

In the above description, the horizontal synchronization signal and the vertical synchronization signal are described as pulse signals, but are not limited to pulse signals. According to the present invention, when the synchronization signals are not pulse signals, the above structure may be modified such that the synchronization signal generation circuit 401 additionally includes a circuit having a function for converting a synchronization signal to a pulse signal and converting a pulse signal to a synchronization signal.

Figure 5:
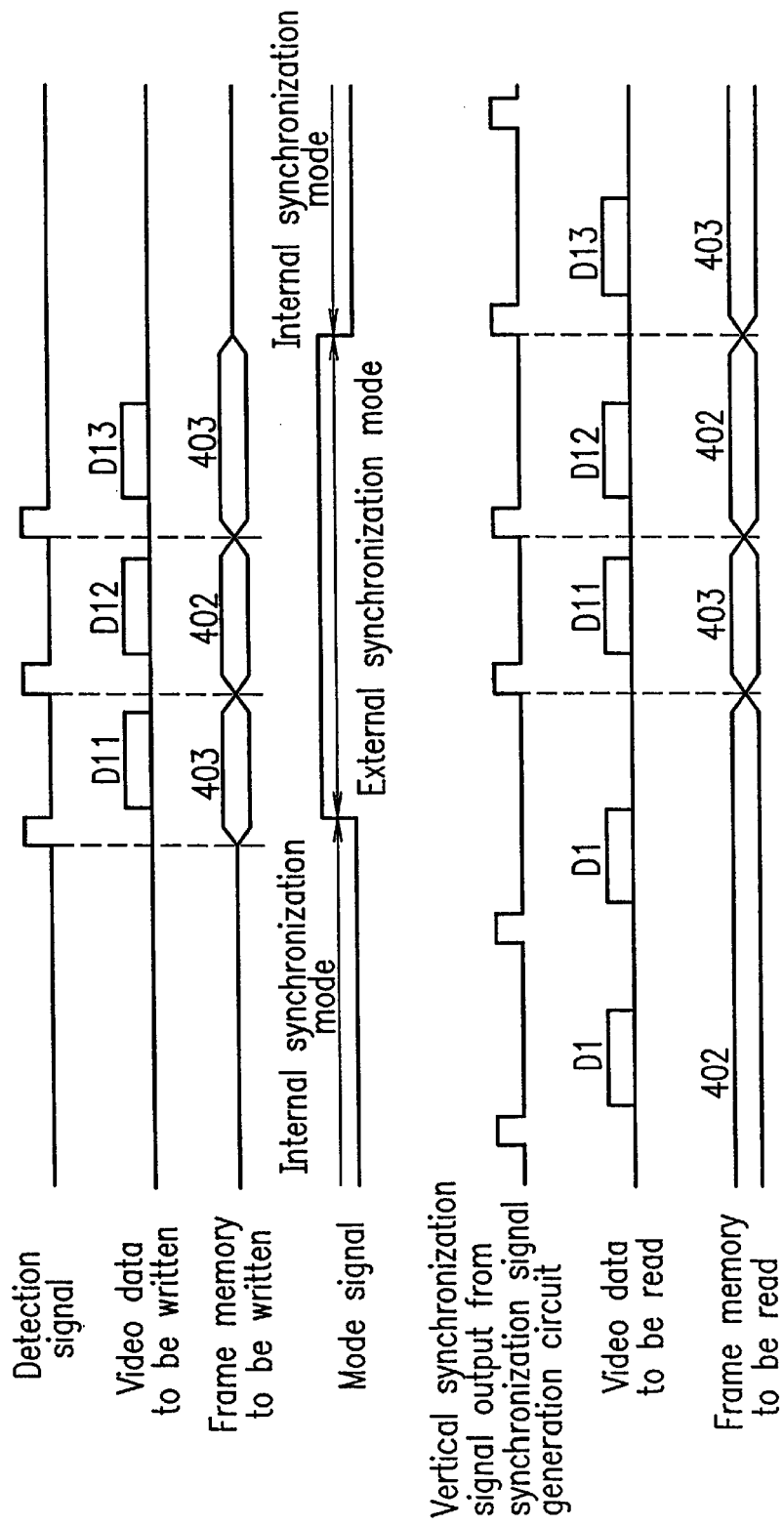
FIG. 5 is a timing chart showing respective signal pulses in the image display apparatus according to the present invention.
Figure 6:
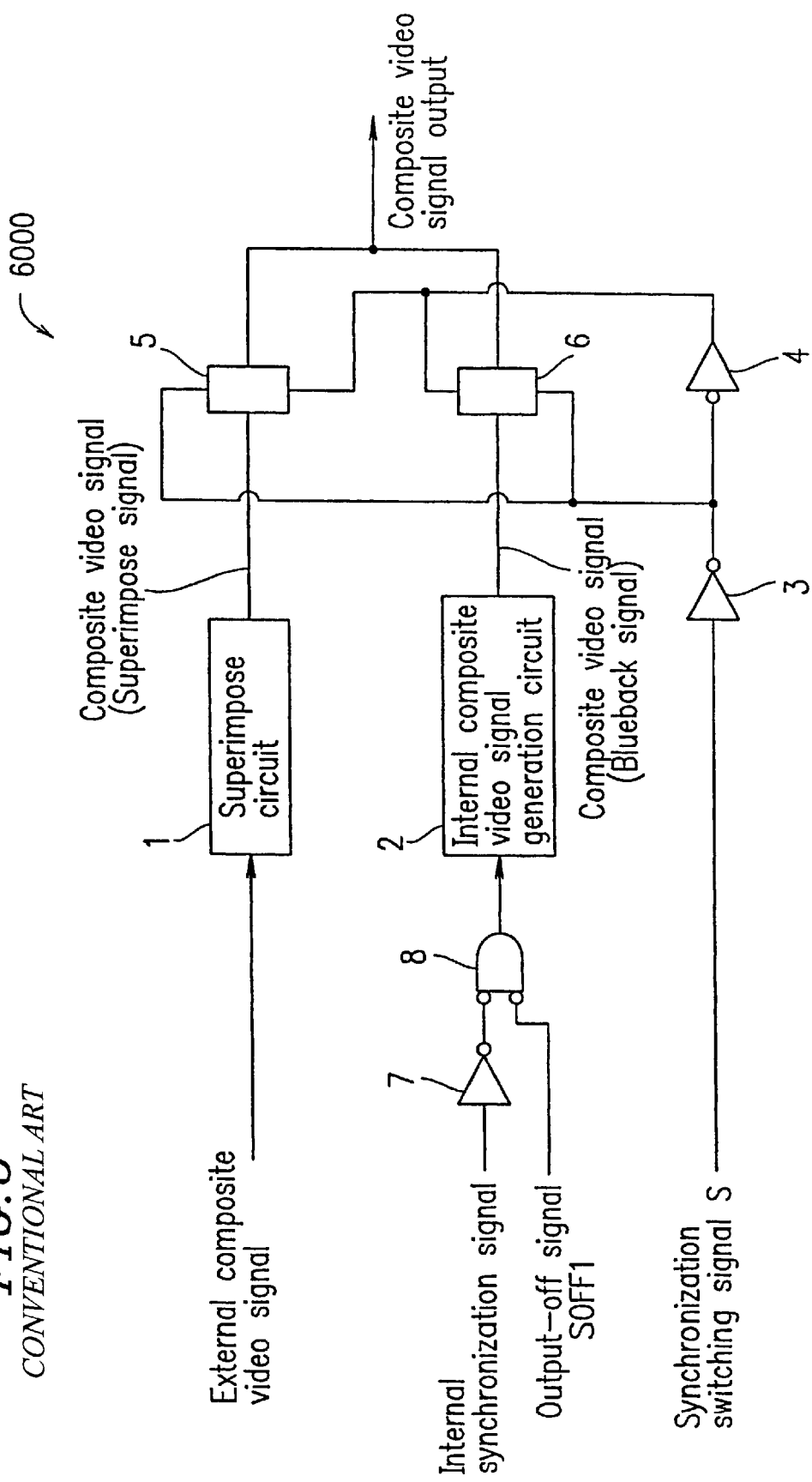
FIG. 6 is a block diagram showing a circuit which uses a conventional image display switching method.
Figure 7:
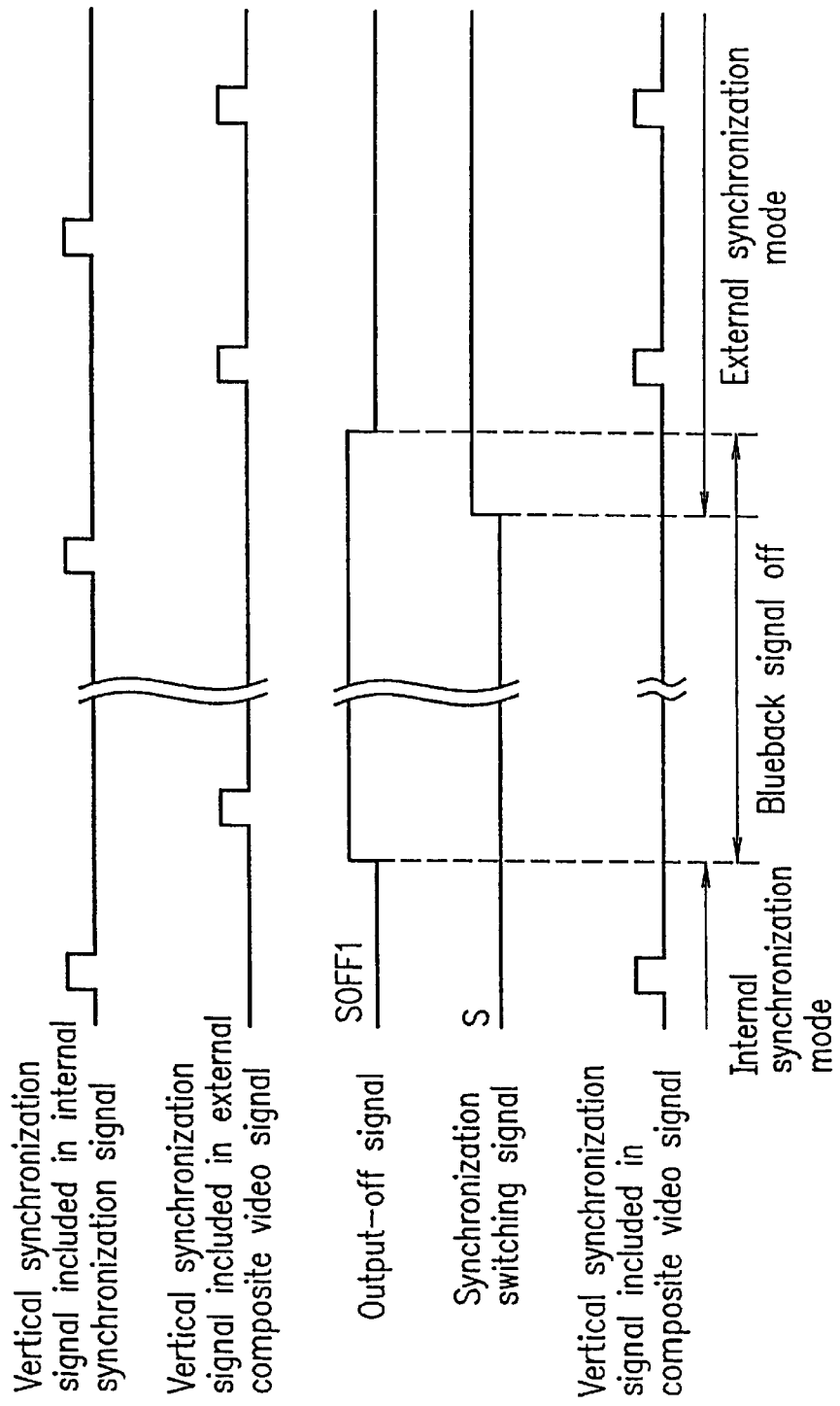
FIG. 7 is a timing chart showing respective signal pulses in the circuit shown in FIG. 6.
Figure 8:
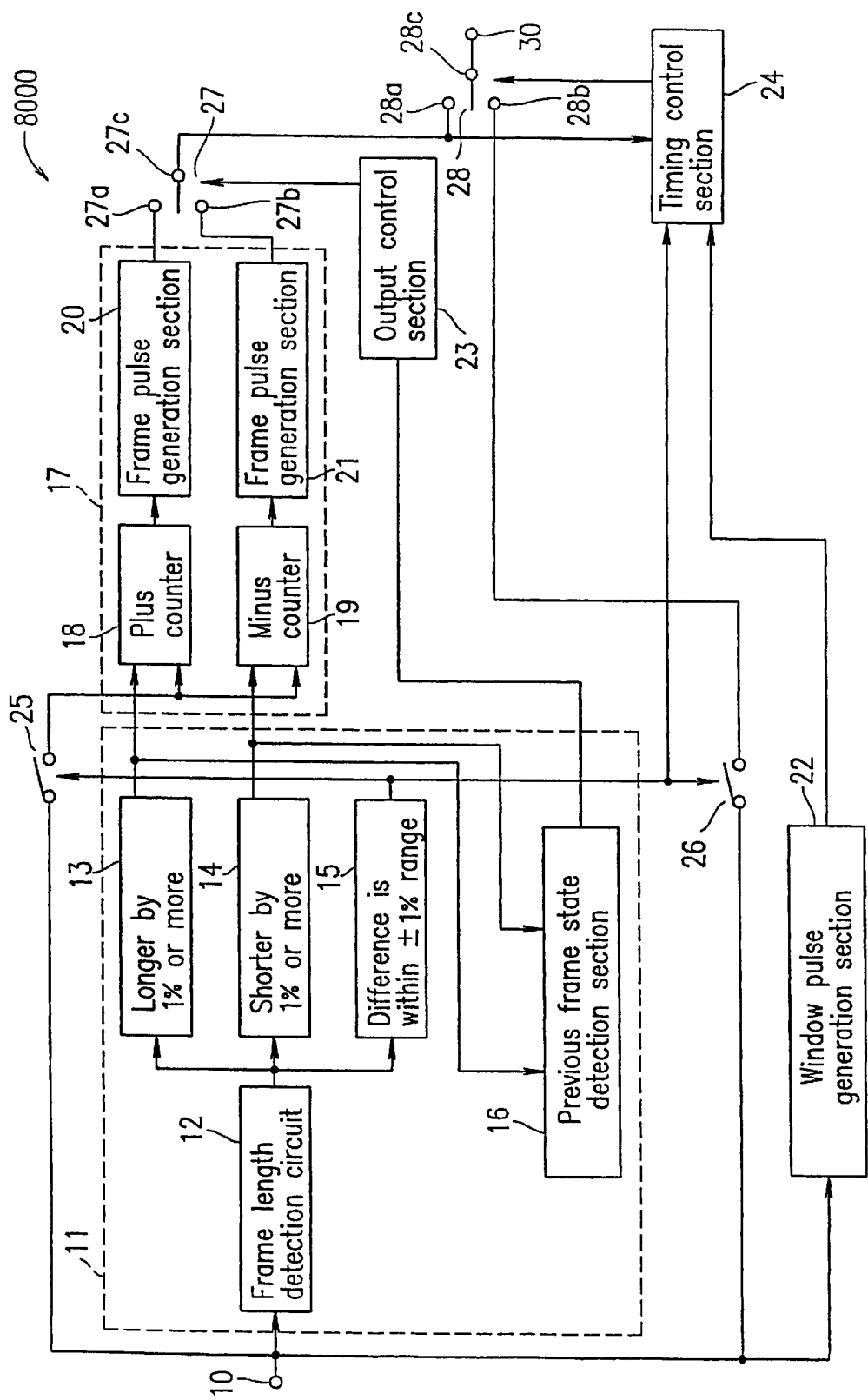
FIG. 8 is a block diagram showing a frame pulse generation circuit used in a conventional record and reproduction apparatus.
Figure 9:
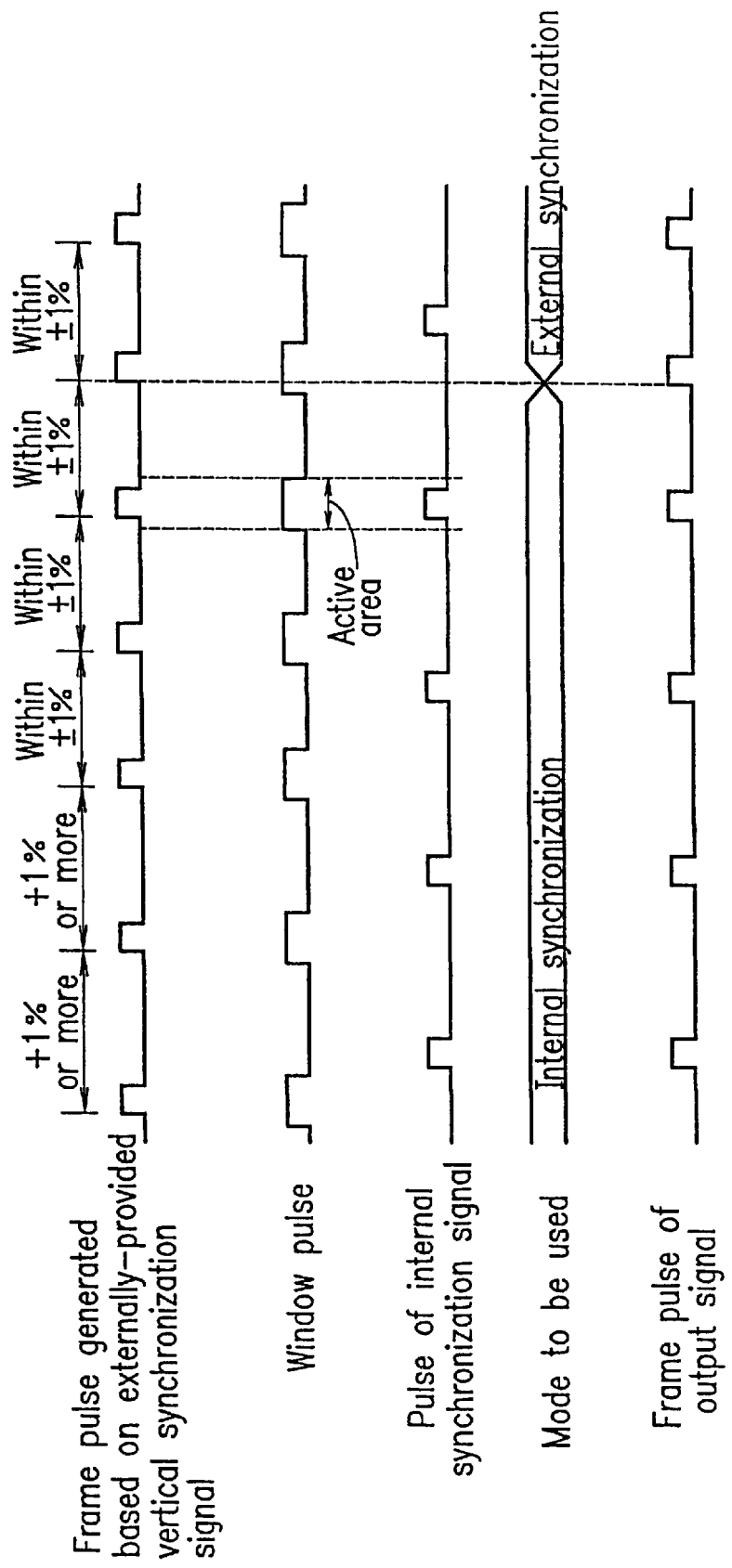
FIG. 9 is a timing chart showing respective signal pulses in the frame pulse generation circuit shown in FIG. 8.

FIG. 5 is a timing chart for illustrating a switching operation between the frame memory 402 and the frame memory 403 in the image display apparatus 4000 shown in FIG. 4. In the case where an externally-supplied vertical synchronization signal is not input to the synchronization signal generation circuit 401, and accordingly, a detection signal is not input from the synchronization signal generation circuit 401 to a write control circuit 404, data to be read which is stored in the frame memory 402 is continuously used because there is no data to be written. The video data to be read is data (D1) which has been previously written and stored in the frame memory 402.

In the internal synchronization mode, when a detection signal is input from the synchronization signal generation circuit 401 to the write control circuit 404, the frame memory in which data is to be written is switched from the frame memory 402 to the frame memory 403 (i.e., the write control circuit 404 selects the frame memory 403), and externally-supplied video data (D11) is written in the frame memory 403. In the meantime, data is continuously read from the frame memory 402. Furthermore, when the first pulse of the detection signal which corresponds to the first pulse of the externally supplied vertical synchronization signal is output from the synchronization signal generation circuit 401, the vertical synchronization signal is output from the synchronization signal generation circuit 401 but is not masked. Thus, a horizontal synchronization signal which is not in synchronization with the first pulse of the detection signal (i.e., in the internal synchronization mode) is output from the synchronization signal generation circuit 401, and thus, the video data (D1) stored in the frame memory 402 is continuously read out without being deleted. Therefore, the horizontal synchronization signal and the vertical synchronization signal are kept in synchronization, and accordingly, a video image or the like displayed on the display section is prevented from being disturbed.

Alternatively, in the external synchronization mode, when a pulse of the detection signal is written in the write control circuit 404, the frame memory in which data is written and the frame memory from which data is read are both switched. Specifically, for example, when the frame memory 403 is currently selected by the write control circuit 404, the frame memory in which data is written is switched from the frame memory 403 to the frame memory 402, and externally-supplied video data (D12) is written in the frame memory 402. Then, the frame memory in which data is written is switched from the frame memory 402 to the frame memory 403, and externally-supplied video data (D13) is written in the frame memory 403. When the frame memory 402 is currently selected by the read control circuit 405, the frame memory from which data is read is switched from the frame memory 402 to the frame memory 403, and the video data (D11) is read from the frame memory 403. Then, when the frame memory from which data is read is switched from the frame memory 403 to the frame memory 402, the video data (D12) is read from the frame memory 402.

In the case where the waveform of the externally-supplied vertical synchronization signal is shifted with respect to that of a vertical synchronization signal having a standard frequency, or when the supply of a detection signal is stopped, the synchronization signal generation circuit 401 transits to the internal synchronization mode. In this case, the frame memory from which data is read is switched such that the frame memory from which data is read is the same as the frame memory in which data is written. In the case where such a switching operation is performed, if a detection signal is not input to the output determination/reset pulse generation circuit 102 during a period when window pulses are output, the supply of window pulses is stopped, and after the blanking interval, the horizontal counter 104 and the vertical counter 106 are reset at the same time. As a result, the synchronization mode is switched from the external synchronization mode to the internal synchronization mode. Thus, when the synchronization mode is switched from the external synchronization mode to the internal synchronization mode, the horizontal synchronization signal and the vertical synchronization signal are prevented from having an irregular frequency, and accordingly, a video image or the like to be displayed on the display section can be prevented from being disturbed. Note that in the example illustrated in FIG. 5, the frame memory 403 is selected as the frame memory from which data is read and the frame memory in which data is written, and video data (D13) is read from the frame memory 403.

Thus, in the image display apparatus 4000 shown in FIG. 4, both externally-supplied video data (D11, D12, D13: see FIG. 5) and video data which is currently displayed (D1) can be continuously displayed at a predetermined frequency without hindered from being displayed.

In a synchronization signal generation circuit according to the present invention, at a time when an externally-supplied vertical synchronization signal is first identified by means of a detection signal which corresponds to the externally-supplied vertical synchronization signal, a vertical synchronization signal generated in the synchronization signal generation circuit is not output. When a next externally-supplied vertical synchronization signal is input at a predetermined timing, the synchronization signal generation circuit generates and outputs a vertical synchronization signal and a horizontal synchronization signal which are in synchronization with the externally-supplied vertical synchronization signal. With such an arrangement, even when the externally-supplied vertical synchronization signal is intermittently input to the synchronization signal generation circuit, video data can be prevented from being disturbed. Furthermore, if the frequency of a vertical synchronization signal included in an externally-supplied video signal is within a predetermined range set in the synchronization signal generation circuit, all of the externally-supplied video signals can be continuously converted into display images without being deleted.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A synchronization signal generation circuit, comprising:
   a synchronization signal generation section for generating a first vertical synchronization signal and a first horizontal synchronization signal based on an externally-supplied second vertical synchronization signal; and
   a detection section for detecting the second vertical synchronization signal,
   wherein when the second vertical synchronization signal is detected by the detection section for the first time, the first vertical synchronization signal is not output by the synchronization signal generation section, and when the second vertical synchronization signal is detected by the detection section for the next time at a predetermined timing, the first vertical synchronization signal is output by the synchronization signal generation section.

2. A synchronization signal generation circuit according to claim 1, wherein when the second vertical synchronization signal is detected by the detection section for the first time, a second horizontal synchronization signal is output by the synchronization signal generation section, and when the second vertical synchronization signal is detected by the detection section for the next time at the predetermined timing, the first horizontal synchronization signal which is in synchronization with the second vertical synchronization signal is output by the synchronization signal generation section.

3. A synchronization signal generation circuit according to claim 2, wherein the second horizontal synchronization signal is not in synchronization with the second vertical synchronization signal.

4. A synchronization signal generation circuit according to claim 2, wherein the first vertical synchronization signal and the first horizontal synchronization signal which are in synchronization with the second vertical synchronization signal are output during a blanking interval.

5. An image display apparatus, comprising:
   a synchronization signal generation circuit recited in claim 1; and
   at least one storage device which stores externally-supplied video data and from which the video data is read.

6. A synchronization signal generation method for generating a first vertical synchronization signal and a first horizontal synchronization signal based on an externally-supplied second vertical synchronization signal, comprising steps of:
   not outputting the first vertical synchronization signal when the second vertical synchronization signal is detected for the first time, but outputting the first vertical synchronization signal when the second vertical synchronization signal is detected for the next time at a predetermined timing; and
   outputting a second horizontal synchronization signal when the second vertical synchronization signal is detected for the first time, and outputting the first horizontal synchronization signal which is in synchronization with the second vertical synchronization signal when the second vertical synchronization signal is detected for the next time at the predetermined timing.

7. A synchronization signal generation method according to claim 6, wherein the second horizontal synchronization signal is not in synchronization with the second vertical synchronization signal.

8. A synchronization signal generation method according to claim 7, wherein the first vertical synchronization signal and the first horizontal synchronization signal which are in synchronization with the second vertical synchronization signal are output during a blanking interval.

* * * * *